United States Patent [19]
Long

[11] Patent Number: 4,598,675
[45] Date of Patent: Jul. 8, 1986

[54] COMPONENTS FOR INTERNAL COMBUSTION ENGINES

[75] Inventor: William D. Long, Tonawanda, N.Y.

[73] Assignee: Kennecott Corporation, Cleveland, Ohio

[21] Appl. No.: 483,447

[22] Filed: Apr. 15, 1983

Related U.S. Application Data

[62] Division of Ser. No. 224,239, Jan. 12, 1981, abandoned.

[51] Int. Cl.[4] ............................................. F01L 1/14
[52] U.S. Cl. ................................. 123/90.51; 501/88
[58] Field of Search ............ 123/90.51, 193 H, 90.48; 29/156.7 B; 501/88, 89, 97, 103, 104

[56] References Cited

U.S. PATENT DOCUMENTS

| | | | |
|---|---|---|---|
| Re. 30,253 | 4/1980 | Haldeman et al. | 123/193 C |
| 3,408,995 | 11/1968 | Johnson | 123/668 |
| 4,124,667 | 11/1978 | Coppola et al. | 264/29.5 |
| 4,238,434 | 12/1980 | Enomoto et al. | 501/88 |
| 4,359,022 | 11/1982 | Nakamura et al. | 123/188 AA |
| 4,366,785 | 1/1983 | Goloff et al. | 123/90.51 |
| 4,508,066 | 4/1985 | Hartsock | 123/193 H |

FOREIGN PATENT DOCUMENTS

| | | | |
|---|---|---|---|
| 0147036 | 6/1952 | Australia | 123/669 |
| 0691582 | 7/1964 | Canada | 123/668 |
| 0579515 | 6/1933 | Fed. Rep. of Germany | 123/90.51 |
| 0745701 | 3/1944 | Fed. Rep. of Germany | 123/90.51 |
| 0745737 | 4/1944 | Fed. Rep. of Germany | 123/90.51 |
| 0049553 | 4/1980 | Japan | 123/41.83 |

OTHER PUBLICATIONS

Oliver J. Nilsen, "PSZ", Apr. 1980.
West German Research Report No. F 3-77/29 "Hochtemperaturkeramik fur Warmekraftmaschinen [High-Temperature Ceramics for Heat Engines]" by Volkswagenwerk AG 1977, Sheets 3, 4, 11, 12 and 27.
U.S. Journal: Diesel and Gas Turbine Progress, Apr. 1978, pp. 28 and 30.
West German Journal: Motortechnische Zeitschrift 42 (1981) 1, pp. 23–28.

Primary Examiner—W. R. Wolfe
Attorney, Agent, or Firm—Raymond W. Green; R. Lawrence Sahr

[57] ABSTRACT

The present invention relates to improvements in internal combustion engines by the utilization of sintered silicon carbide for the fabrication of certain engine components wherein the silicon carbide starting material used to produce the sintered components is in an ultrafine form. The engine components comprise the valve train and the power assembly. The valve train is comprised of the valve guides, valves, valve caps, rocker arms, valve spring retainer rings, push rods and tappets (lifters). The power assembly is comprised of cylinder lines, valve seats, exhaust port liners, exhaust manifold, flames plates, pistons, piston rings, piston pins and connecting rods.

1 Claim, 2 Drawing Figures

COMPONENTS FOR INTERNAL COMBUSTION ENGINES

This application is a division, of application Ser. No. 224,239, filed Jan. 12, 1981 now abandoned.

TECHNICAL FIELD

The present invention relates to improved internal combustion engines. More particularly, the present invention relates to internal combustion engines using fuels, such as diesel oil, gasoline or alcohol, having improved components in the valve train or in the power assembly. The valve train requires lubrication and functions to feed fuel to, and remove exhaust gases from, the combustion area of the engine, and includes intake and exhaust valves, valve caps, valve guides, valve spring retainer rings, rocker arms, push rods and tappets. The power assembly functions to supply power to the driveshaft of the engine and provides an exit means for exhaust gases, and includes cylinder liners, valve seats, exhaust port liners, exhaust manifold, flame plates, pistons, piston rings, piston pins and connecting rods.

BACKGROUND ART

Internal combustion engines are an essential part of civilization as we know it today. Internal combustion engines literally surround us in our everyday life, from automobiles, trucks, airplanes, trains and boats to lawnmowers and snowblowers. With the present oil shortage and environmental pressures, any improvements in the efficiency or in the anti-pollution featurs of internal combustion engines are rapidly adopted and widely used.

More recently, the trend in the automobile industry, urged by consumer demand and government regulations, has been to improve the horsepower to weight ratio of internal combustion engines. Since a lighter engine can run at higher rpm's and deliver more power, a priority has been given to the development of lighter engine parts. By reducing weight and inertia loads, the use of lighter weight parts also lowers stresses on the parts.

The development of parts having a lower heat loss than metal is also a highly desirable goal. When more heat is kept inside the engine, more power can be produced for a given displacement, thus obtaining improved fuel efficiency.

The present invention provides improved movable components for internal combustion engines. The present components are stronger, lighter, have a much higher temperature capability and have a lower heat conductivity than steel; they have improved wear properties facilitating close dimensional tolerances and associated tighter clearances that can be maintained over long periods of time and greater temperature extremes. The present components have improved lubricating surfaces which permits the use of oils or lubricants which do not contain expensive additives or surfactants.

DISCLOSURE OF THE INVENTION

The present invention relates to improvements in internal combustion engines by the utilization of sintered silicon carbide material for the fabrication of certain engine components wherein the silicon carbide starting material used to produce the sintered components is in an ultra-fine form. The engine components comprise the valve train and the piston or power assembly. The valve train is comprised of the valve guides, valves, valve caps, rocker arms, valve spring retainer rings, push rods and tappets (lifters). The power assembly is comprised of cylinder liners, valve seats, exhaust port liners, exhaust manifold, flame plates, pistons, piston rings, piston pins and connecting rods.

The present components combine the advantages of high heat resistance, hardness, long wearing and light weight with the further advantage that the surfaces thereof have an excellent adherence for lubricants, such as oil. Because of higher engine pressures, greater heats and longer times between oil changes in the internal combustion engines of today, various, somewhat exotic, additives have been proposed for engine lubricants. The present components, fabricated of sintered silicon carbide, have external surfaces which are wetted by oil. Excellent lubrication on friction-bearing surfaces may be obtained using lower viscosity lubricants without additives. Thus, cheaper, or lower grade lubricants may be utilized in internal combustion engines containing the present components. Further, the components of the present invention have very low friction on dry contact, as compared to metals usually utilized in internal combustion engines. Thus, the present components are additionally useful during engine start-up, when contact surfaces may be dry or when a malfunction causes oil loss during engine operation. In such situations, the wear on dry surfaces will not be catastrophic and result in immediate engine failure.

The silicon carbide starting material utilized to fabricate the present components is utilized in ultra-fine form. A suitable ultra-fine material may be produced by grinding, ball milling or jet milling larger particles of silicon carbide and subsequently classifying or separating a component suited to fabricate the components of the present invention. Preferably, the silicon carbide starting material has a maximum particle size of about 5 microns and an average particle size of about 0.10 to about 2.50 microns. It is difficult to obtain accurate particle size distribution for silicon carbide powders having a size less than about 1 micron in size, and, therefore, surface area may be considered relevant in determining suitable material. Accordingly, the preferred silicon carbide particles for use in the present powders have a surface area of from about 1 to about 100 $m^2/g$. Within this range, it is more preferred that the surface area of the particles range between about 2 and about 50 $m^2/g$, and, within that range, a range from about 2 to about 20 $m^2/g$ has been found eminently useful.

The present sintered silicon carbide components may be produced by various sintering methods. Preferably, the components are produced using substantially pressureless sintering or reaction sintering techniques. Generally, in substantially pressureless sintering, the finely-divided silicon carbide starting material is initially mixed with a small amount of excess carbon and a sintering aid and sintered in an atmosphere inert to the components, under substantially pressureless conditions, at temperatures in a range between about 1900° and about 2300° C. Examples of processes to produce a sintered silicon carbide material useful in the present invention are described in U.S. Pat. Nos. 4,124,667 and 4,179,299, the disclosures of which are incorporated herein by reference. In reaction sintering methods, the initial finely-divided silicon carbide is typically mixed with carbon or graphite. The mixture is then molded using a temporary binder to the desired shape and subsequently heated to eliminate the binder and produce a porous body. The porous body is then treated with silicon to infiltrate the pores thereof. Typically, such treatment is carried out in a vacuum induction furnace at temperatures between about 1400° and about 1900° C. at a pressure of about 0.5 mm of mercury. Under such conditions, the silicon component infiltrates the porous body and reacts with the carbon or graphite material to form, insitu, silicon carbide. The resultant body consists essentially of silicon carbide, but contains some residual free silicon. U.S. Pat. Nos. 2,907,972; 2,938,807; 3,205,043; and 3,495,939 are examples of such processes. It has been proposed to utilize a thermosetting resin as the binder which is subsequently carbonized to supply some of the carbon for the siliconizing, or siliciding, step. U.S. Pat. Nos. 3,947,550 and 4,044,110 are illustrative of such teachings.

The present components may be produced from sintered silicon carbide by initially forming or molding the mixture to be sintered into the shape of the engine component and subsequently sintering to produce the component. If required, the sintered component may be machined or polished to obtain the desired dimensions. An alternate, but more expensive, and less desirable method is to start with a block or rod of sintered silicon carbide and grind or machine the components therefrom.

Although the present invention covers the separate use of any of the components of either the valve train or the power assembly in an internal combustion engine, it will be appreciated that the more of the present components that are incorporated in the engine, the better the overall low friction and the more efficient will be the performance.

Looking now at the valve train in more detail, the valve guides are typically press fitted in the cylinder or cylinder head. The stems of the valves are movably positioned within the bore of the valve guides. The intake and exhaust valves are spring loaded in one direction and cam operated in the other through rocker arms, in the case of an overhead engine, or through plungers, in the case of an L-head engine. Each valve comprises a valve head and a stem reciprocally mounted in the valve guide. The stem end of the valves contact, either directly, or indirectly through a valve cap, a rocker arm, or plunger, as the case may be. The valves permit entrance of a fuel—air mixture into a cylinder and exhaust of the combustion products from the cylinder following ignition. The most efficient and widely used arrangement is the overhead arrangement, whereby the valves are positioned over the piston and are opened by being pushed downward into the cylinder. The valve guides are positioned in the engine head. The valve is pushed downward by one part of a pivoted horizontally-extending rocker arm which, in turn, is activated by an upward motion of a vertical-extending push rod which is positioned generally perpendicular to the valve stem and is urged upward by the camshaft acting through a tappet. Lubrication of the valve stem is typically carried out by supplying oil to the point of contact of the rocker arm and valve stem and allowing the oil to flow along the valve stem to lubricate the stem and valve guide. However, because of the close dimensional tolerances desired between the stem and guide, little, if any, oil supplied to the valve stem end is fed or penetrates to the opposite end of the valve stem. Such valves, therefore, generally operate dry with a squeaky hard action. As wear occurs in the guide or valve stem, excess oil tends to work its way through the guide to the head of the valve, where it will be drawn into the combustion chamber, in the case of an intake valve, or will be contacted by hot exhaust gases, in the case of an exhaust valve. In either case, the oil will be burned, causing smoke in the exhaust and increased pollution. The present valve and valve guide allow close dimensional tolerances to be maintained over long periods of time because of the wearability of the components and the ability of the sintered silicon carbide to provide a lubricating surface, i.e., a surface wetted and retaining a layer or film of oil. The stem end of the present valves is activated by contact with a rocker arm, either directly, or indirectly through a valve cap. The rocker arm of the present invention may be fabricated wholly of sintered silicon carbide or of a metal, such as steel, having inserts of sintered silicon carbide at the points of contact, e.g., with the valve stem or valve cap at one point and with the push rod tip at the other point. The rapid and repeated contact between the components takes place between lubricated surfaces of silicon carbide, giving longer life because of less wear, less weight in moving engine parts and less internal friction in the engine. The valve spring retainer is also preferably fabricated of sintered silicon carbide to take advantage of its light weight, high stiffness and hardness. The push rod that actuates the rocker arm and the tappet that contacts the camshaft are also preferably fabricated of sintered silicon carbide to give durability, lightness and less friction between the engine components. The push rod of the present invention may be fabricated totally of sintered silicon carbide, or alternatively, of a metal, such as steel, with contact tips of sintered silicon carbide.

Looking now at the power assembly in more detail, the piston member has a crown or head portion which holds and houses a number of rings for oil control and for sealing the combustion chamber above the piston from the oil case below, to prevent both gas leakage and oil pumping. Typically, there are two sealing rings, called compression rings, positioned near the top of the piston crown, and one or more oil-control rings positioned below the sealing rings. Usually, the compression rings do not form a solid circle, but instead are finely split and prestressed to expand from the grooves in which they are housed to form an intimate contact with the cylinder wall to achieve the desired sealing. The oil-control ring or rings act to prevent oil from proceeding further into the cylinder. Thus, when the piston is near the top dead center position, there is little or no oil in the cylinder area adjacent the contact area of the sealing ring, which results in abrasion of both the sealing ring and cylinder wall. As a result, fuel comsumption is higher than it would be in the absence of such abrasion, and, over a period of time, the upper cylinder flares, the upper compression ring wears, and the engine operation becomes less efficient.

The top or head portion of the piston acts as the reaction surface for the combustion in a corresponding cylinder of the engine. The top of the cylinder is enclosed by a flame plate. Extending from, and usually part of, the head portion of the piston is a skirt portion that functions to guide the piston in a reciprocating movement within the engine cylinder. A pair of bosses is positioned in the skirt portion of the piston head. A generally cylindrical piston pin bore extends through each boss, with the two bores being coaxial. Each bore receives the end of a piston pin. A connecting rod is journalled at one of its ends about the center portion of the piston pin and at its other end about a crankshaft. In the operation of a typical reciprocating engine, a driving force, usually an expanding gas, within the combustion chamber of the engine is transmitted from the piston head through the piston pin bosses to the piston pin. The force is then transmitted to the connecting rod and then to the crankshaft. The present piston, piston rings and cylinder liner fabricated of sintered silicon carbide allow close dimensional tolerances to be maintained between the cylinder wall and piston wall over long periods of time. The self-lubricating property of the present sintered silicon carbide surfaces is particularly useful in the piston ring and cylinder contact areas. The relative lightness of the present silicon carbide components and their inertness to high temperature, high resistance to corrosion and erosion make the present components particularly useful in the flame plate, valve seat, exhaust port liner and exhaust manifold areas to provide a more efficient and extended engine operation. The piston pin and connecting rod used with the present piston and cylinder liner are also preferably fabricated of the sintered silicon carbide of the present invention. The forces acting on the piston head are transmitted directly to the piston pin and then to the connecting rod. Such forces tend to flex the piston pin and cause flattening along the portion of the pin in contact with the piston bosses. The pin will not then be entirely axially aligned with the piston bosses, thereby causing a portion of the driving force to be localized at the extreme ends of the engine cylinder. The recurrent concentration of forces can cause scoring of the cylinder wall and, in extreme cases, cause the piston to crack because of tensile stresses induced in the pin bores of the piston itself. The present piston pins possess a very high Youngs Modulus and hardness, and thus are resistant to flattening and wear, have a lower friction coefficient, are lighter than steel and provide better lubrication between the friction-bearing surfaces. The present connecting rods are also preferably fabricated of sintered silicon carbide for durability, stiffness, lightness and superior lubrication properties along bearing or journalled faces.

The components of the present assemblies may be separately and advantageously utilized; however, the present invention is useful on the components of internal combustion engines that require lubrication within the engine, and the contact or friction-bearing surfaces are preferably between components comprised of sintered silicon carbide to minimize friction because of the oil adhesion properties of the silicon carbide surface and maximize the hardness and relative light weight of silicon carbide.

BEST MODE FOR CARRYING OUT THE INVENTION

Figure 1:
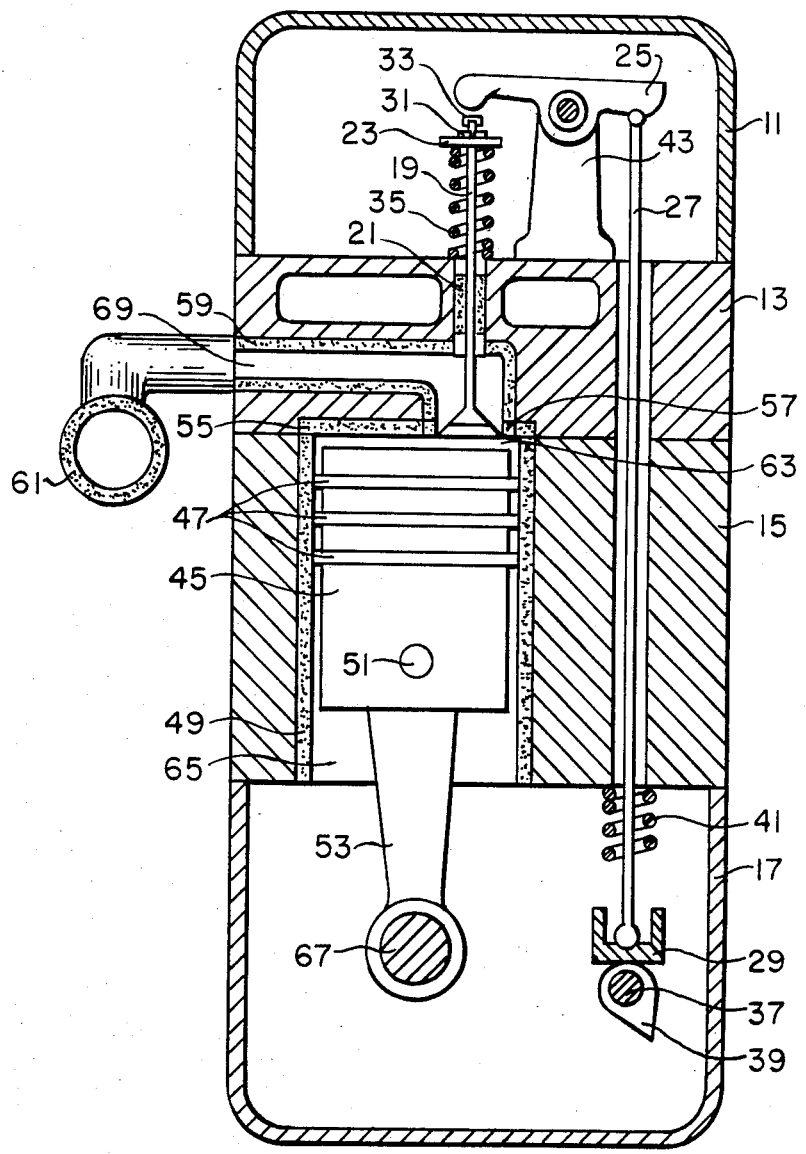
FIG. 1 is an elevated view, partly in section, of a portion of an internal combustion engine showing the valve and piston assemblies of the invention.

Referring to the drawings to illustrate the invention in more detail, FIG. 1 is a conventional internal combustion engine having cover 11, head 13, block 15 and pan 17. The valve assembly is comprised of valve 19, valve guide 21, valve spring retainer ring 23, rocker arm 25, push rod 27 and tappet 29. Valve spring retainer ring 23 is held in place on the valve stem by split ring 31 and as shown the stem of valve 19 is equipped with valve cap 33. In operation, valve 19 reciprocates through the bore of valve guide 21, being urged into a closed position by valve spring 35. As the camshaft 37 rotates, lobe 39 forces tappet 29 to move push rod 27 upward against the urging of spring 41. The upward movement of push rod 27 acts on one portion of rocker arm 25 causing a downward movement on the opposite portion. Such downward movement engages valve spring cap 33 and causes valve 19 to be depressed, against the urging of spring 35 to an open position.

The components of the present valve assembly are preferably fabricated of sintered silicon carbide. The valve guide 21 is in an elongated cylindrical form having a relatively uniform diameter so that it will have a press fit in a bore in cylinder block 13. Valve 19 is movably positioned within valve guide 21 with dimensional tolerances in the order of 1 to 5 mils. The lubricant-wetting, wear-resistant surfaces of the present valves and valve guides make them aptly suited to use in conventional overhead internal combustion engines where the valves and valve guides are lubricated by allowing oil to flow downward along the valve stem. In addition, in the valve and valve guide combinations presently in use, the high heat generated within the engine, especially in the exhaust valve area, causes the flange portion of the valve members to be heated and the heat transferred to the stem portion of the valve. Under such conditions, the lubricant along the stem portion may be carbonized, reducing the clearance between the valve guide and valve stem and effectively blocking the entrance of further lubrication. Such deposits increase in thickness until the valve is stuck in an open position. This condition renders the stroke of the piston ineffective to transfer the work of the piston to the crankshaft and further causes the valves to burn. The present valve and valve guide components alleviate the lubricating problems by their surfaces, which are wetted by and hold a layer or film of lubricant thereon. The lubricated, wear-resistant surfaces of the valve and valve guide allow a close dimensional tolerance to be maintained over a long period of time, thus reducing the noise level of the engine by reducing valve flutter.

The valve spring retainer ring 23 is positioned adjacent the stem end of valve 19 and retains valve spring 35 in place. Valve spring retainer ring 23 is held in place by a metal split washer 31 inserted into a circumferential slot in the valve 19. As shown, the stem end of valve 19 may have a valve cap 33 preferably of a free-floating type, positioned thereon to promote rotation and to additionally reduce wear. Valve caps, such as 33, are more usefully employed on exhaust valves rather than intake valves. Rocker arm 25 is pivotally mounted on bracket 43. Although the motion transmitted to the valve is vertically downward, the motion of the rocker arm is along the diameter of rotation of the rocker arm, thus, a horizontal force component is introduced at the contact point. Such movement while in contact results in a scoring or wearing of the top of the valve stem, or valve cap, and the contact point on the rocker arm. The present components fabricated of finegrained sintered silicon carbide are particularly suited to use, being hard, stiff, long wearing and with low friction, lubricant-retaining surfaces.

The opposite end of rocker arm 25 intermittently contacts push rod 27 which extends downward adjacent tappet 29 which, in turn, is in contact with cam 39. Rotational movement of the cam 39 produces a reciprocal motion of push rod 27. The use of the components of the present invention as rocker arms, push rods and tappets, because of their strength, light weight, high stiffness, wearability, low friction and high hardness provide a more efficient engine operation.

The power assembly is comprised of piston 45 with piston rings 47, cylinder liner or insert 49, piston pin 51 and connecting rod 53. Preferably, the piston assembly also includes flame plate 55, valve seat 57, exhaust port liner 59 and exhaust manifold 61. A mixture of air and fuel is directed through an intake valve into the combustion chamber 63 of cylinder 65. After combustion of the fuel mixture, piston 45 is driven downward and, acting through piston pin 51, drives connecting rod 53 downward to exert force on driveshaft 67. After combustion and on the exhaust stroke of the engine, the exhaust gases are exited through exhaust port 69 into exhaust manifold 61 positioned adjacent cylinder head 13 and attached thereto in a substantially gas-tight manner. The components of the present invention fabricated of fine-grained sintered silicon carbide are aptly suited to use in the power assembly of conventional internal combustion engines, being strong, hard, light weight, heat resistant and, in addition, having very low friction coefficient.

Figure 2:
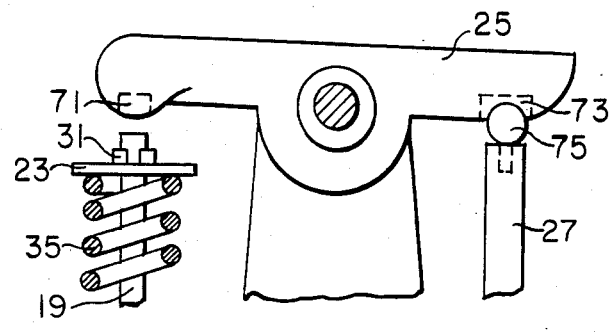
FIG. 2 is a partial verticle view showing an alternative embodiment of the rocker arm, wherein the rocker arm is fabricated of a metal and has sintered silicon carbide at the point of contact with the piston stem and with the push rod tip. This view also shows the push rod fabricated of a metal tipped with sintered silicon carbide.

Looking now at FIG. 2, which shows in detail an alternative embodiment of the rocker arm, push rod tips and valve stem arrangement which was shown in FIG. 1. In this embodiment, rocker arm 25 is fabricated of metal, suitably steel, and has a wear insert, or pad, of fine-grained sintered silicon carbide at one or both the points of contact with the valve stem or valve cap and with the push rod tip. As shown in FIG. 2, wear insert 71 of rocker arm 25 is in position to contact the stem portion of valve 19 and wear insert 73 of rocker arm 25 is in contact with the tip 75 of push rod 27. Push rod 27 may be fabricated wholly of sintered silicon carbide, or may be equipped, at either or both ends, with wear tips of sintered silicon carbide. As shown in FIG. 2, the body of push rod 27 is fabricated of a metal, and tip 75, suitably attached to push rod 27 by insertion, is fabricated of sintered silicon carbide. The opposite end of push rod 27, not shown, in contact with tappet 29, may also be tipped with silicon carbide in a similar manner.

It will be appreciated that any of the components of the present invention are compatible with conventional engine components and may be separately incorporated into conventional internal combustion engines, thus decreasing the weight of reciprocating parts, providing components with better wear protection and decreasing friction. However, it will also be appreciated that the more of the present components that are utilized, the more efficient the engines will be.

Although the present engine components have been described primarily in terms of a four cycle engine, it will be appreciated that the present components are equally adaptable and useful in simple, or opposed piston two-cycle engines.

It will be appreciated that the present invention is not to be considered as limited to the specific examples and embodiments given in the foregoing and that various modifications may be made within the ordinary skill of the art without departing from the spirit and scope of the invention.

What is claimed is:

1. In an internal combustion engine having a cylinder head and a cylinder block, a valve assembly comprised of a plurality of valve guides mounted within said cylinder head, a plurality of valves with valve stems positioned within and movable through said valve guides, a plurality of valve spring retainer rings positioned adjacent the stem ends of said valves, a plurality of rocker arms adapted to move said valves within said valve guides, a plurality of push rods adapted to engage said rocker arms at one end, and having tappets positioned adjacent the opposite end, said tappets adapted to engage and be reciprocally moved by a cam, a power assembly comprised of a plurality of pistons having piston rings thereon and adapted to be received within cylinder liners, positioned within said cylinder block, a plurality of piston pins movably attached within each piston to a connecting rod, a plurality of flame plates, valve seats and exhaust port liners positioned within said cylinder head and an exhaust manifold positioned adjacent said cylinder head, the improvement which comprises the tappets being fabricated entirely from sintered silicon carbide.

* * * * *